United States Patent [19]

Whelan

[11] Patent Number: 4,853,126
[45] Date of Patent: Aug. 1, 1989

[54] PAINT STRAINER

[75] Inventor: James P. Whelan, North Marshfield, Mass.

[73] Assignee: Ad-Tec Products, Inc., Plymouth, Mass.

[21] Appl. No.: 202,522

[22] Filed: Jun. 6, 1988

[51] Int. Cl.[4] .............................................. B01D 23/28
[52] U.S. Cl. ..................................... 210/469; 210/474; 210/497.2; 210/497.3; 210/506
[58] Field of Search ........... 210/469, 474, 479, 497.01, 210/497.1, 497.2, 497.3, 506; 55/521

[56] References Cited

U.S. PATENT DOCUMENTS

| 752,019 | 2/1904 | Adwen | 210/497.2 |
|---|---|---|---|
| 3,567,033 | 3/1971 | Whelan | 210/497.2 |
| 3,738,889 | 6/1973 | Whelan | 210/497.2 |
| 3,741,397 | 6/1973 | Gerson et al. | 210/497.2 |
| 4,064,053 | 12/1977 | Gerson et al. | 210/497.2 |
| 4,362,624 | 12/1982 | Ueda | 210/497.3 |
| 4,559,140 | 12/1985 | Croteau | 210/497.3 |
| 4,680,117 | 7/1987 | Freeman | 210/474 |

FOREIGN PATENT DOCUMENTS 1591035 1/1977 United Kingdom ............ 210/497.2

Primary Examiner—Richard V. Fisher
Assistant Examiner—Wanda L. Millard
Attorney, Agent, or Firm—R. T. Gammons

[57] ABSTRACT

A paint strainer of conical configuration provided with peripherally-spaced discharge openings in the side wall above the tip, a secondary opening located between the peripherally-spaced openings, and a discharge opening at the tip located in the side wall between the secondary openings and the tip. The openings are covered with mesh.

1 Claim, 2 Drawing Sheets

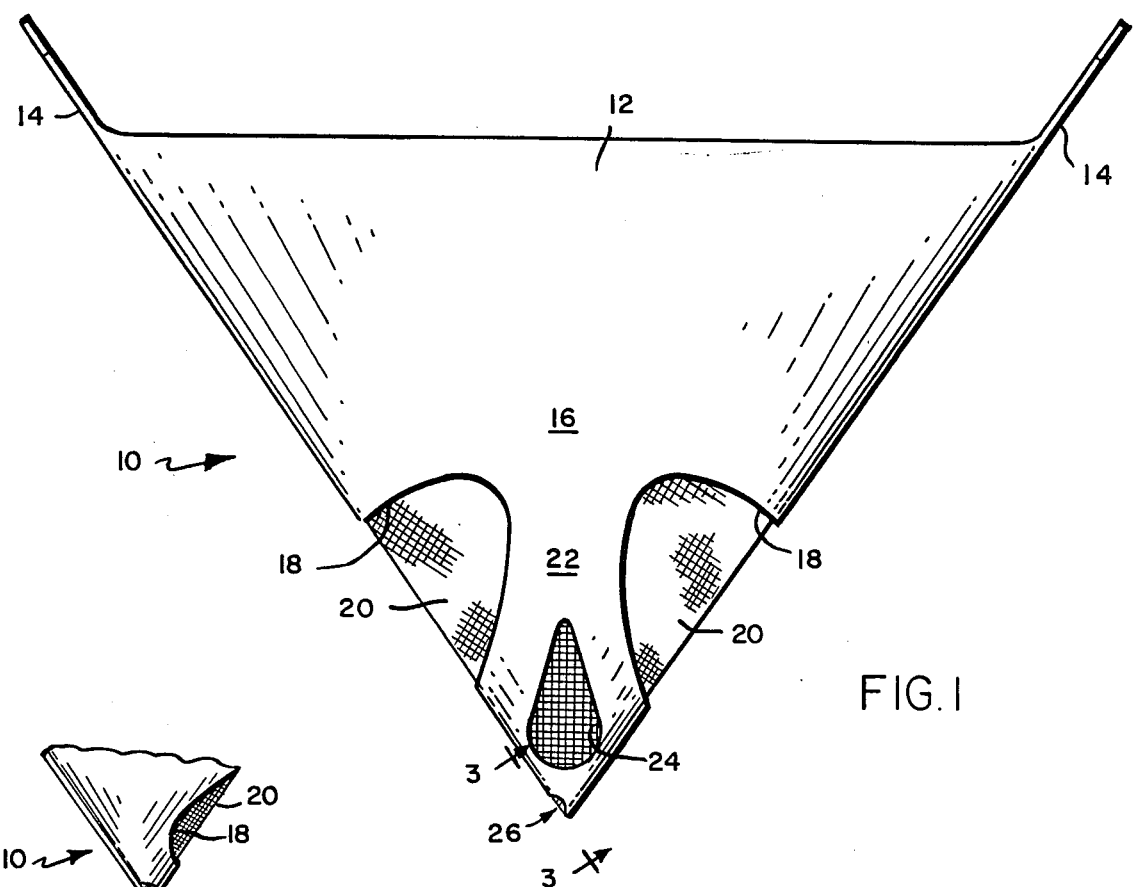
FIG. 1
FIG. 3
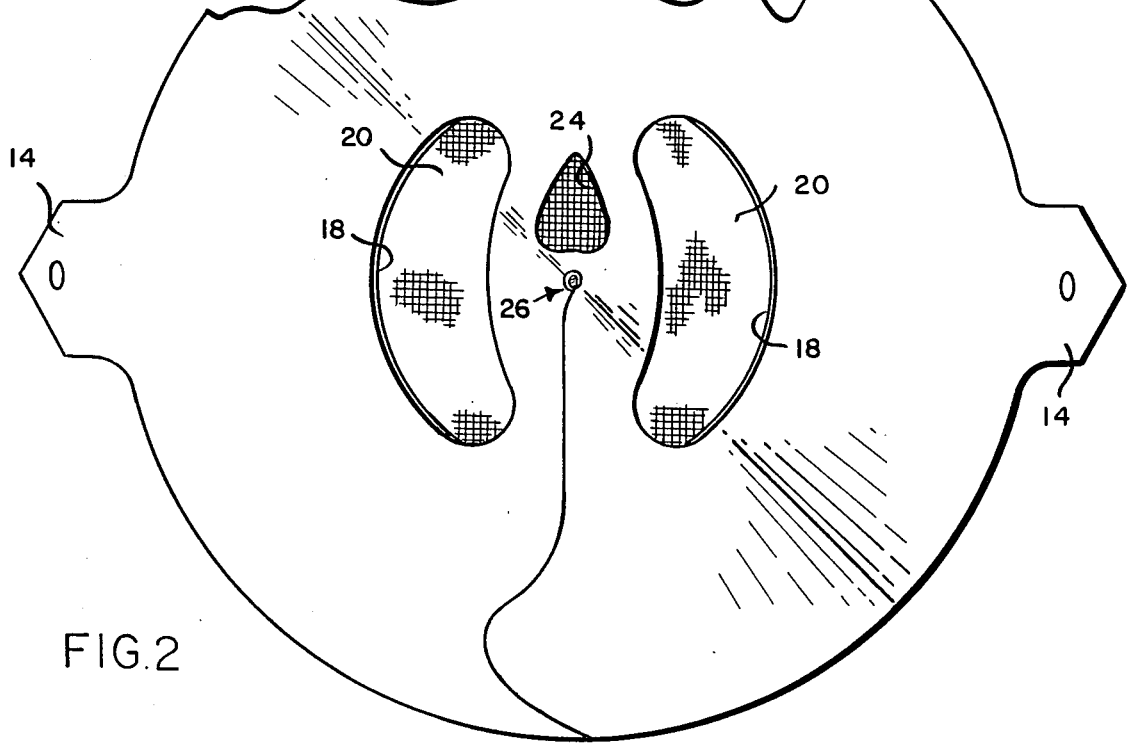
FIG. 2

PAINT STRAINER

BACKGROUND OF THE INVENTION

In my U.S. Pat. No. 4,158,631, there is shown and claimed a paint strainer of conical configuration provided at its lower end with diametrically-disposed discharge openings and between the diametrically-disposed openings, a secondary drainage opening adjacent the tip. The discharge and secondary openings are covered with a mesh to permit paint to strain through. The secondary opening is provided to obtain maximum drainage. It has been found that, because the secondary opening is located in the side wall above the tip and does not extend all the way to the tip, paint collects within the strainer at the tip. It is, accordingly, desirable to provide a structure wherein there is complete drainage at the bottom without weakening the support provided by the tip.

Conical strainers are shown in U.S. Pat. Nos. 752,019 and 4,064,053 which have in common open lower ends with mesh spanning the open lower ends, hence providing for complete drainage, but no support. U.S. Pat. No. 4,622,146 discloses a structure wherein there is mesh supported within the cone above the open lower end; U.S. Pat. No. 4,157,631 shows a structure wherein the mesh covers an opening in the side wall above the bottom; and U.S. Pat. No. 4,559,140 shows a structure provided at the tip with a side wall opening which extends halfway around the tip and all the way to the lower end of the tip covered with mesh. The structures thus shown have in common the disadvantage that they either fail to provide for complete drainage and/or fail to provide adequate support at the lower end of the cone. It is the purpose of this invention to provide a strainer wherein the conical lower end is intact, thus providing maximum support while at the same time providing for complete drainage.

SUMMARY OF THE INVENTION

The invention as herein illustrated comprises a conical structure embodying a side wall opening above the tip and a drainage opening at the tip obtained by folding a blank having a convex upper edge, a concave lower edge and convex end edges joining the upper edge to the lower edge to bring the opposite ends into overlapping engagement to form the cone, the blank being characterized in that said lower edge contains midway between its opposite ends asymmetrical portions such that when the blank is folded to bring the end edges into overlapping engagement, an aperture is formed at the apex of the cone.

The invention will now be described in greater detail with reference to the accompanying drawings, wherein:

FIG. 1 is an elevation of the strainer;

FIG. 2 is a bottom view;

FIG. 3 is a fragmentary view taken on the line 3—3 of FIG. 1;

Figure 4:
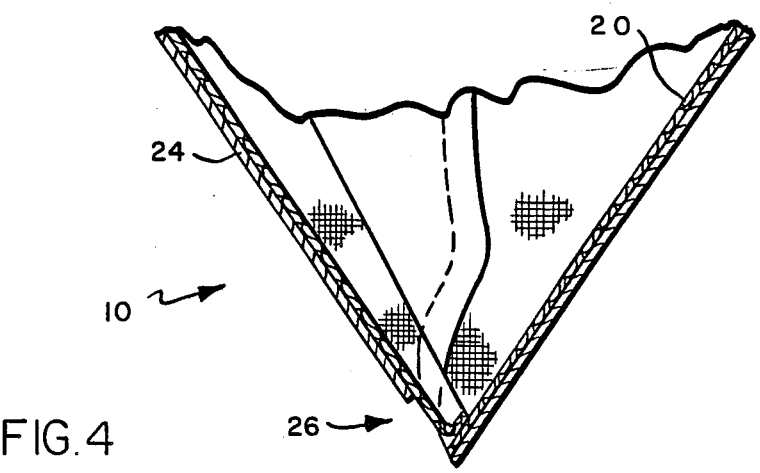
FIG. 4 is a diametrical section at the lower end.

Referring to the drawings, the paint strainer as herein illustrated comprises a conical structure 10 of relatively stiff sheet mateiral, for example, paperboard, comprising an upper part 12 open at the top, at opposite sides of which are diametricallydisposed, perforated ears 14—14, and a lower part 16. Between the upper and lower parts, there are diametrically-disposed wall openings 18—18 covered with foraminous material 20 and intermediate the wall openings, wall portions 22—22 comprised of the imperforate material of the wall structure which connects the upper and lower parts to each other. One of the wall portions 22 contains a secondary opening 24, also covered with foraminous material. The secondary opening 24 is somewhat teardrop in configuration and located symmetrically in the lower portion between the wall openings 18—18 with its apex intermediate the upper and lower edges of the wall openings 18—18 and its lower curved edge 28 situated adjacent the tip of the cone.

The purpose of the secondary opening 24 located adjacent the closed lower end thereof was to assist complete drainage of the paint at the bottom of the cone. While this secondary opening 24 accomplishes to a degree such drainage, there remains a pocket at the tip within which paint accumulates.

In accordance with this invention, to obtain complete drainage so that no paint remained at the lower end of the strainer, a drainage opening 26 is provided in the side wall at the apex of the tip. This opening 26 is of relatively small size compared to the wall openings 18—18 and the secondary opening 24. However, it is of sufficient size to effect complete drainage. An opening of approximately 1/16 of an inch in diameter has been found to be suitable. Such an opening, while effectively completing drainage, is of such small size as not to impair the rigidity of the tip which circumscribes the openings to allow the filter material within the cone to extend through it. Thus, the opening at the tip provides for complete drainage without impairing the support for the cone as is characteristic of the prior art.

Figure 5:
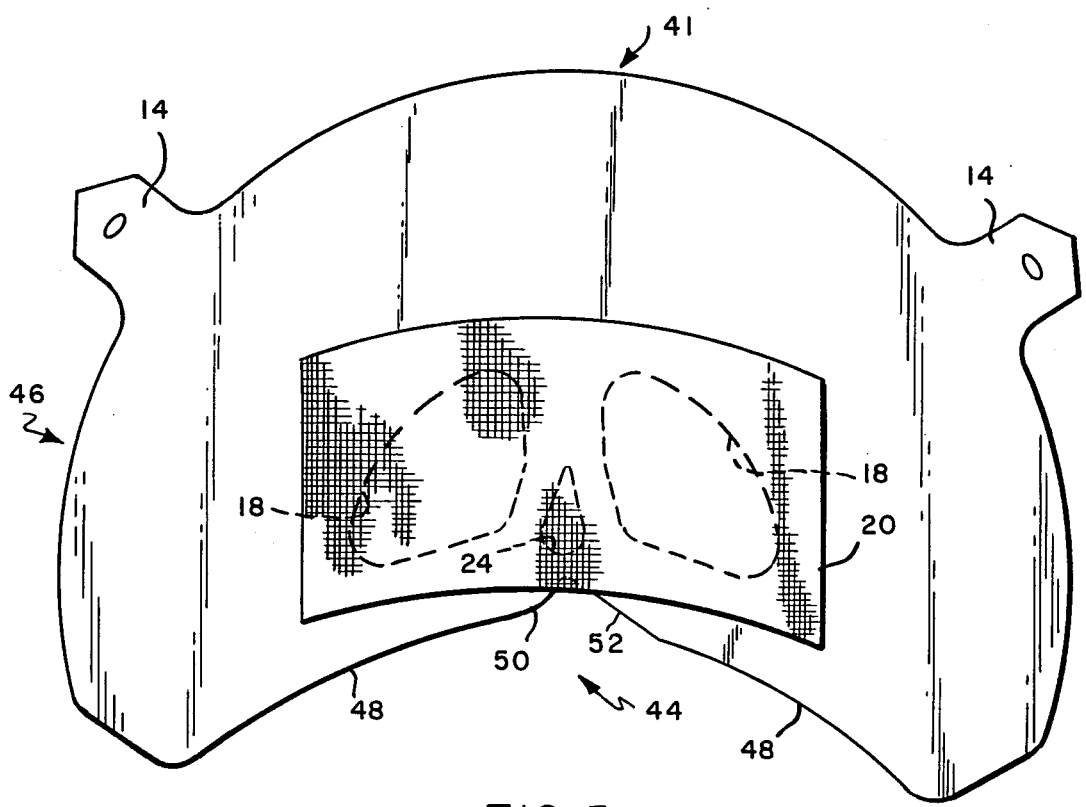
FIG. 5 is a plan view of a blank structured to form the strainer of the instant invention.

In accordance with the invention, the opening 26 at the tip is formed by providing a blank 40, FIG. 5, diecut from sheet material so as to have an upper convex arcuate edge 41, a lower concave arcuate edge 44, and arcuate end edges 46—46. In accordance with the invention, the arcuate concave lower edge 44 has symmetrical concave portions 48—48 which converge midway between the opposite sides in asymmetrical portions 50 and 52 such that when the blank is folded into the form of a cone, the asymmetrical edges 50 and 52 define the opening 26 at the lower end of the cone which provides for complete drainage of the cone. The portions 50 and 52, as shown, comprise a convex portion and a straight portion so that in the overlapping position of the ends of the blank at the very tip, a gap is left which constitutes the opening 26.

The foraminous material 20 which is used to cover the openings 22—22 and the opening 24 is extended downwardly on the blank so as to subtend the lapping edges at their intersection. Hence, when the blank is folded, the material 20 covers the opening 26.

It should be understood that the present disclosure is for the purpose of illustration only and includes all modifications or improvements which fall within the scope of the appended claims.

What is claimed is:

1. A conical strainer embodying a conical side wall defining a rim and terminating in a tip; peripherally-spaced, symmetrically-disposed openings in the side wall of the cone located between the rim of the cone and the tip, adjacent to, but above, the tip; an intermediate opening located in the side wall between the symmetrically-disposed, peripherally-spaced openings above the tip, but below the upper ends of the peripherally-spaced openings; and a drainage opening disposed between the intermediate opening and the tip, said drainage opening extending less than half the distance around the tip and terminating at a defined apex of the tip such that the extremity of the tip is imperforate.

* * * * *